AMPLITUDE LIMITING CIRCUIT

Filed June 26, 1956

INVENTORS R. L. MADSEN
A. C. SCHELL
BY Alan C. Rose
ATTORNEY

June 21, 1960 R. L. MADSEN ET AL 2,942,197

AMPLITUDE LIMITING CIRCUIT

Filed June 26, 1956 2 Sheets-Sheet 2

INVENTORS R. L. MADSEN
A. C. SCHELL

BY Alan C. Rose

ATTORNEY

United States Patent Office 2,942,197

Patented June 21, 1960

2,942,197

AMPLITUDE LIMITING CIRCUIT

Raymond L. Madsen, New Providence, N.J., and Allan C. Schell, South Dartmouth, Mass., assignors to Bell Telephone Laboratories, Incorporated, New York, N.Y., a corporation of New York Filed June 26, 1956, Ser. No. 593,860

9 Claims. (Cl. 328—171)

This invention relates to amplitude limiters, and more particularly to limiters for frequency modulation transmission systems.

In frequency modulation systems, signal information is transmitted by changes of the instantaneous frequency of the high frequency carrier wave. Although it is desirable to maintain the carrier wave at a constant amplitude, in actual practice many factors such as undesirable transmission characteristics, for example, introduce variations in the received signal amplitude. Frequency modulation receivers employ limiters to eliminate the undesired amplitude variations before detection of the frequency modulated signals.

One type of limiter which has been widely used includes a vacuum tube amplifier having oppositely poled diodes in its plate circuit. The diodes are biased to clip the positive and negative peaks of the frequency modulated signals. While such a limiter is satisfactory for many purposes, it has been discovered that they are not satisfactory for certain high fidelity purposes. Specifically, it has been determined that limiters of the type described above introduce varying amounts of phase shift in accordance with the level of the applied signal. This phase shift, or phase modulation, is indistinguishable from frequency modulation, and therefore introduces undesired noise and distortion.

Accordingly, the principal object of the present invention is the elimination of distortion in amplitude limiting circuits.

In accordance with the invention, it has been determined that the undesired amplitude to phase modulation of plate type limiter circuits is caused by the reactive components of the impedance in parallel with the limiting diodes. This reactance is caused by several factors, including the input and output capacitance of the amplification tubes, and the stray wiring capacitance.

In addition to determining the cause of the undesired amplitude to phase conversion, we have determined how this adverse effect may be avoided. Specifically, we have discovered that the addition of a network which includes the inherent reactances mentioned above, and which presents infinite or purely resistive impedance to the fundamental and which presents zero, infinite or purely resistive impedance to the principal harmonics of the applied frequency modulation signal, has the effect of eliminating the undesired amplitude to phase conversion. The required network is of the transmission line character, and normally includes at least two resonant circuits, with the resonant or antiresonant frequencies of the resonant network properly adjusted so that the impedance presented by the network has substantially no reactive components at the fundamental frequency or at the principal harmonic frequencies of the applied signal.

When the required amount of amplitude limiting cannot be obtained in a single limiting stage, it may be desirable to cascade two limiters. In conventional limiters, however, if the clipped output of the first limiter is applied directly to the second limiter, the amount of limiting effected by the second limiter is considerably less than that effected by the first limiter. To avoid this difficulty, a buffer stage may be placed between the two limiters to extract the fundamental frequency from the output of the first limiter and apply it to the second limiter. Through the use of such a buffer stage, similar wave forms are applied to both limiters, and the limiting action of the second limiter is equal to that of the first.

Accordingly, a subsidiary object of the present invention is the improvement of the output wave form of limiting circuits, so that the buffer stage required for proper operation of cascaded limiter stages may be eliminated.

This object is accomplished by the use of a specific network of the class described above in combination with a plate type limiter having a symmetrical diode clipping circuit. The impedance versus frequency characteristic of the network is such that it has nearly infinite impedance at the fundamental frequency, and presents substantially zero impedance (or a very low purely resistive impedance) at the principal odd harmonics of the frequency applied signals. This has the effect of developing a limited output voltage in which the odd harmonics (produced by a symmetrical diode clipping circuit) are suppressed, and which therefore closely resembles a sine wave. This permits the direct cascading of limiter stages.

Other objects and various features and advantages of the invention may be readily apprehended from the following description of illustrative embodiments of the invention, from the claims, and from the drawings.

Figure 1:
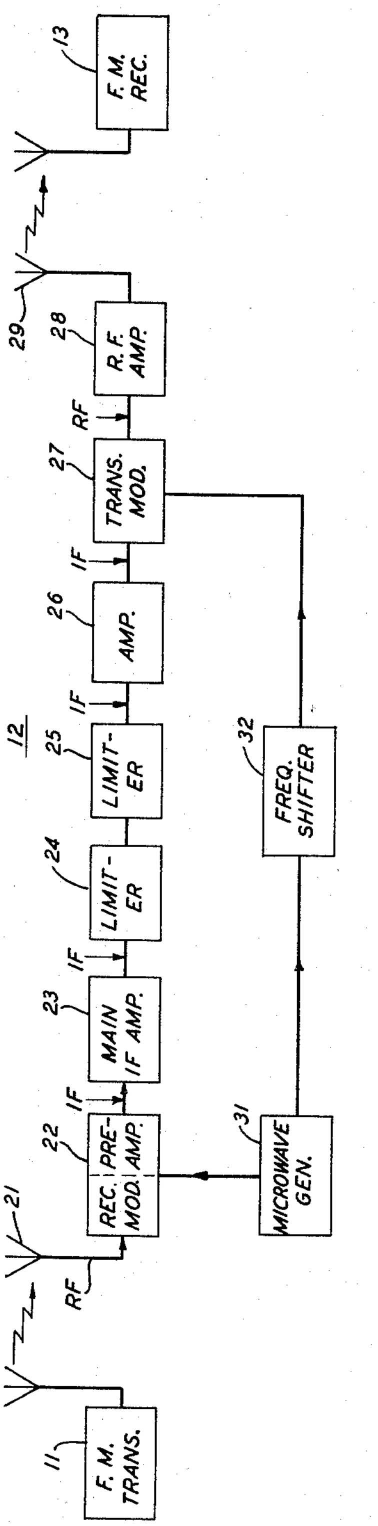
Fig. 1 is a block diagram of a frequency modulation transmission system.

With reference to the drawings, Fig. 1 shows a block circuit diagram of a frequency modulation transmission system. In Fig. 1, signals are transmitted from the frequency modulation transmitter 11 to the repeater station 12, and are retransmitted to the frequency modulation receiver 13. Many repeaters such as that shown at 12 may be employed in a single system; for example, one frequency modulation system now in use extends across the United States and includes approximately 107 repeaters.

The repeater 12 includes the receiving antennna 21, the receiving modulator and preamplifier 22, the main intermediate frequency amplifier 23, and two cascaded limiters 24 and 25. The present invention relates to the limiter circuits which are employed, and these circuits will be discussed in detail in connection with the remaining figures of the drawings. The main transmission channel of the repeater 12 may also include another intermediate frequency amplifier 26, a transmitting modulator 27, a radio frequency amplifier 28, and the transmitting antennna 29. In addition, the microwave generator 31 is employed as a beat frequency oscillator. The frequency shifting circuit 32 is employed to change the radio frequency output frequency with respect to the frequency of the received signals, and thus reduce cross-talk between the transmitting and receiving antennas.

In operation, the frequency modulation signals transmitted between the antenna of the transmitter 11 and the repeater receiving antenna 21 may be about six kilomegacycles. After heterodyning with signals from the microwave generator 31, the intermediate frequency which may be employed is approximately 70 to 75 megacycles. The bandwidth of the frequency modulation signals is about 30 megacycles. Other details of a frequency modulation transmission system to which the present limiter circuits are applicable are disclosed in an article entitled "The TD-2 Microwave Relay System," by A. A. Roetken, K. D. Smith, and R. W. Friis, which appeared at pages 1041 to 1077 of the October 1951 issue of the Bell System Technical Journal.

Figure 2:
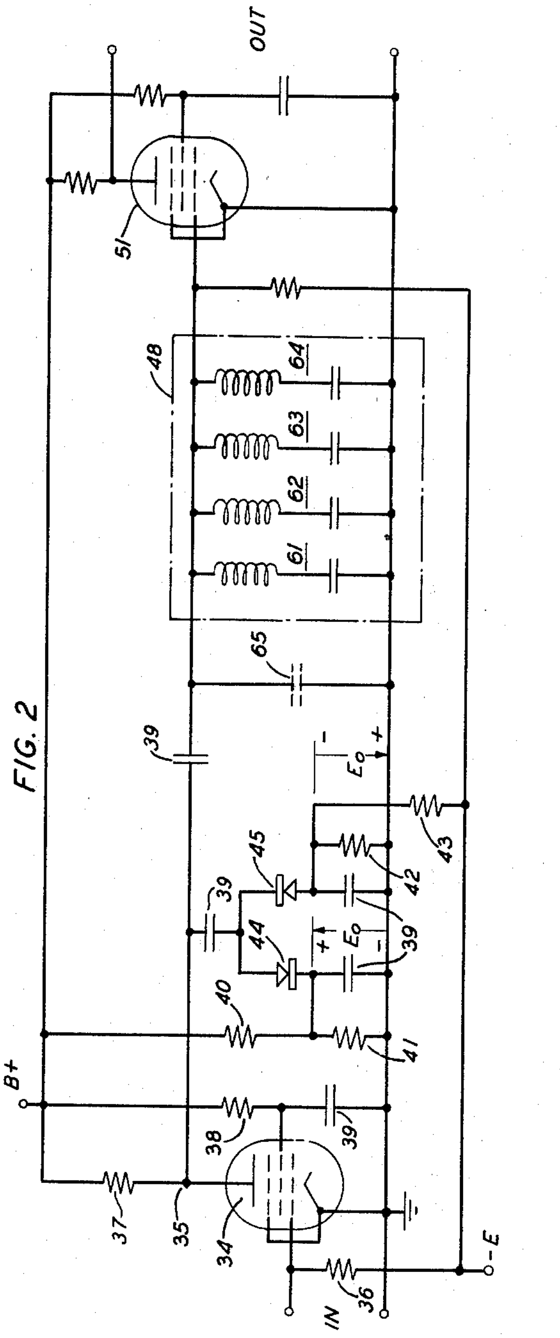
Fig. 2 is a circuit diagram of an amplitude limiter in accordance with one specific illustrative embodiment of the invention.

Fig. 2 is a circuit diagram of a plate type limiting circuit in accordance with the invention. Frequency modulation signals are applied to the control grid of the pentode 34 and appear at its plate output lead 35. The circuits including the grid resistor 36, the load resistor 37, and the screen resistor 38 which are connected to the pentode 34 are conventional. The plate and screen grid circuits of the pentode 34 include several bypass and coupling capacitors of relatively large magnitude, all of which are designated by the reference character 39. Frequency modulation signals on lead 35 are applied to a clipping circuit including the asymmetrically conducting devices 44 and 45 which may, for example, be diode rectification devices. The diodes 44 and 45 are oppositely poled, and are oppositely biased to clip the positive and negative peaks of the amplified frequency modulation signals. Considering the clipping circuit in detail, it includes the three capacitors 39, and the four resistors 40 through 43. The voltage divider including the two resistors 40 and 41 biases the diode 44 positively, and the diode 45 is biased negatively by the divider including resistors 42 and 43. Accordingly, the diode 44 passes current and clips positive peaks which exceed its positive bias, and the diode 45 clips negative peaks when they exceed the negative bias provided by resistors 42 and 43.

A transmission line type network 48, including a plurality of resonant circuits, is connected in parallel with the diode clipping networks. The function of the network 48 will be described in detail hereinafter. Amplitude limited signals are coupled from the plate circuit 35 of tube 34 to the input grid of the pentode 51 of the next subsequent stage of amplification or limiting. The shunt capacitance of the plate and grid circuits of the tubes 34 and 51 is indicated by the capacitor 65 shown in dashed lines.

Figure 3:
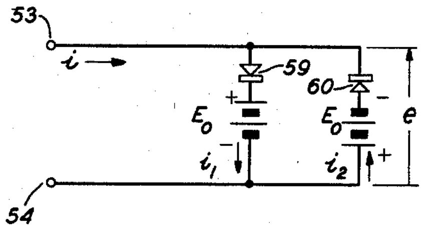
Fig. 3 is a diagram of an ideal symmetrical limiter circuit.
Figure 4:
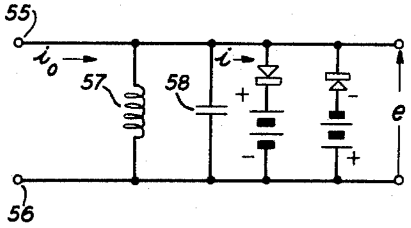
Fig. 4 is a circuit diagram of a limiter circuit including reactive impedance in parallel with the clipping diodes.

The circuits of Figs. 3 and 4 are useful in understanding the principles underlying the present invention. More specifically, the circuit of Fig. 3 represents an ideal balanced limiter in which signals from a driving tube such as the pentode 34 of Fig. 2 are applied at terminals 53 and 54 to a diode clipping network which presents a purely resistive impedance. In the circuit of Fig. 4, however, the impedance presented at the input terminals 55 and 56 is not purely resistive, but includes reactive components. These reactive components are produced by the inductor 57 and the capacitor 58, which might represent a simple interstage coupling circuit. At the fundamental frequency, the impedance is purely resistive and nearly infinite, but at the principal harmonics, the impedance is reactive, due to the predominance of the capacitive reactance at higher frequencies.

Because of the clipping action of the oppositely poled diodes, the harmonic content of the output voltage $e$ in the circuits of Figs. 3 and 4 is relatively high. As the amplitude of the input signal varies, the amount of energy at each of the harmonic frequencies changes. The reason for this may be seen intuitively from the different output wave forms which appear when sine waves of various amplitudes are clipped at a given amplitude level. When the impedance is purely resistive, as in the case of the ideal limiter of Fig. 3, this change in harmonic content produces no phase shift in the resultant wave form. With a combined resistive and reactive network as in Fig. 4, however, each harmonic frequency undergoes a different phase shift. The change in input signal amplitude, with the corresponding change in the amplitude of each harmonic, therefore produces a net phase shift in the resulting wave form.

The circuit of Fig. 3 will now be analyzed from a mathematical standpoint.

Let the current $i_1$ through diode 59 be expressed as follows:

$$i_1 = I_0[\epsilon^{+\alpha(e-E_0)} - 1] \quad (1)$$

and let the current $i_2$ through diode 60 be expressed by the following formula:

$$i_2 = I_0[\epsilon^{-\alpha(e+E_0)} - 1] \quad (2)$$

where $i_1$ is the current through diode 59,
$i_2$ is the current through diode 60,
$I_0$ is the reverse saturation current of diode 59,
$\epsilon$ is the base of the natural or Napierian system of logarithms,
$\alpha$ is a proportionality constant relating to the properties of the diodes,
$e$ is the output voltage as indicated in Fig. 3, and
$E_0$ is the bias voltage on each of the diodes.

The sum of the two currents is $$i = I_0\epsilon^{-\alpha E_0}(\epsilon^{\alpha e} - \epsilon^{-\alpha e}) \quad (3)$$

$$i = 2I_0\epsilon^{-\alpha E_0} \sinh \alpha e \quad (4)$$

where $i$ is the total input current, or the sum of $i_1$ and $i_2$ in Fig. 3, and "sinh" is the symbol representing the hyperbolic sine.

The hyperbolic sine can be written in terms of the following series:

$$i = I_B\left[(\alpha e) + \frac{(\alpha e)^3}{3!} + \frac{(\alpha e)^5}{5!} + \ldots\right] \quad (5)$$

where $$I_B = 2I_0\epsilon^{-\alpha E_0}$$

If input signal $i$ is a pure even or odd function of time, $e$ also will be a pure even or odd function of time. This is established by Equation 5. Hence, the fundamental component of $i$ will be in phase with the fundamental component of $e$, and this relation is independent of the amplitude of $i$. Since $i$ is a frequency modulation signal, it appears to be a sine wave with a slowly varying phase. But over several cycles of the carrier frequency, it appears much like a pure sinusoidal wave or an odd or even function of time depending on the choice of the zero time axis. Consequently, there is no amplitude to phase conversion with the limiter configuration of Fig. 3.

The following equations can be written for the circuit of Fig. 4:

$$i_0 = i + \frac{1}{L}\int e\,dt + C\frac{de}{dt} \quad (6)$$

$$i_0 + I_B \sinh \alpha e + \frac{1}{L}\int e\,dt + C\frac{de}{dt} \quad (7)$$

where $i_0$ is now the input frequency modulation signal. If $i_0$ is again thought of as an odd or even function of time, examination of the right-hand side of Equation 7 reveals some interesting results. The voltage $e$ no longer can be purely odd or even with a pure odd or even function $i_0$ as the input. This results from the fact that integrating or differentiating an even function of time makes it an odd function and vice versa. Thus, $e$ must be a combination of an odd and even function such that the equation is satisfied. Each frequency component of $e$ is then the sum of a sine and a cosine term. As the amplitude of $i_0$ varies, the relative magnitude of the sine and cosine components changes to satisfy Equation 7. The resultant of the sine and cosine terms, therefore, experiences phase shift, and amplitude to phase conversion results.

Figure 5:
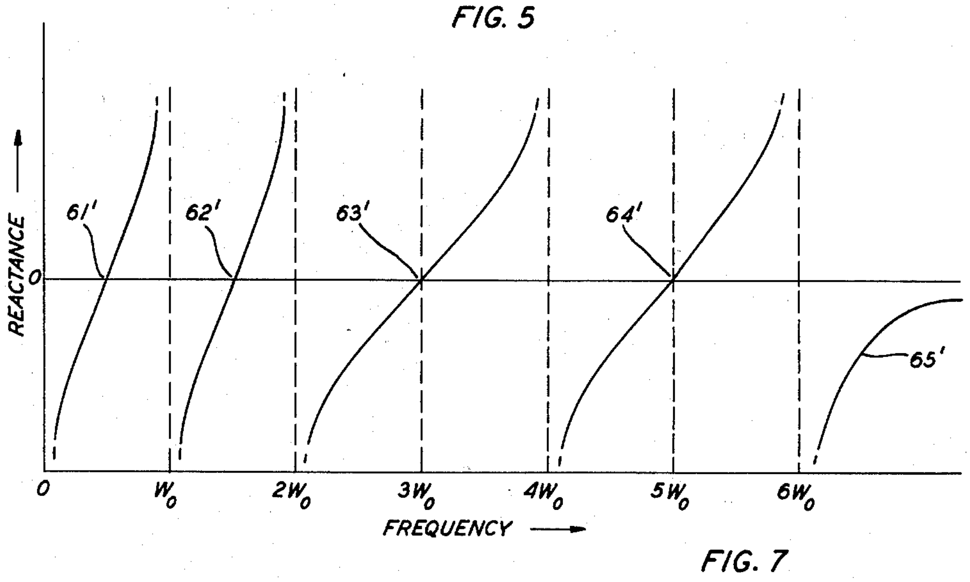
Fig. 5 is a reactance versus frequency plot for the limiter circuit of Fig. 2.

Returning to the circuit of Fig. 2, the nature and function of the circuit 48 will now be considered. The circuit 48 includes the four resonant circuits 61 through 64 connected in parallel. The network 48 presents essentially zero impedance at the resonant frequency of any of the resonant circuits. The resonant frequencies of the circuits 61 through 64 are chosen with respect to the fundamental frequency $W_0$ of the applied signals as indicated in Fig. 5. Specifically, the circuits 61 through 64 have resonances at the points designated 61' through 64'. It may be observed that between each resonance, the reactance characteristic goes to infinity. It may also be noted from Fig. 5 that the reactance of the fundamental and at the principal even harmonics of the applied signal is infinite, and that the reactance at the principal odd harmonics of the applied frequency is zero. As indicated at 65' in Fig. 5, at higher frequencies the reactance characteristic becomes asymptotic to the zero axis as a result of the capacitance 65 indicated in Fig. 2.

In considering the effect of the circuit 48 of Fig. 2, it should be remembered that it is desired to eliminate the reactive components of the limiter impedance to avoid phase shift, and to produce an approximate sine wave output to permit the direct cascading of limiter stages. It is known that a symmetrically clipped wave is principally composed of odd harmonics in addition to the fundamental. With reference to Fig. 5, it may be seen that at the fundamental frequency $W_0$ the network 48 presents a substantially infinite impedance; the substantially constant current output from the pentode 34 therefore produces a large (limited) output voltage at this frequency. At the principal odd harmonic frequencies, the impedance network presents zero impedance; the output wave therefore does not include these components which tend to square up the limited output voltage. In the event that the diode clipping circuit is not entirely symmetrical, some of the principal even harmonics may be generated. To avoid different phase shift for these even harmonics if they should be produced; it may be observed in Fig. 5 that the reactive impedance of the network 48 at the second, fourth, and sixth harmonics is substantially infinite.

The values of the circuit elements in the circuit 48 of Fig. 2 must be adjusted to correspond to the fundamental frequency of the applied signals. Techniques for deriving the exact mathematical values of the circuit 48 to obtain response characteristics such as that shown in Fig. 5 are set forth in chapter V of volume II of "Communication Networks," by E. A. Guillemin, New York, John Wiley & Sons, Inc., 1935. In this text, attention is particularly directed to Fig. 55 and Fig 59, and the mathematical analysis developed in chapter V.

As mentioned above, the circuit 48 of Fig. 2 includes four resonant circuits, with the resonant frequency of each resonant circuit corresponding to a point of zero reactance in the plot of Fig. 5. By use of four resonant circuits, the resultant transmission line type network presents zero, infinite, or purely resistive impedance to the fundamental and to the harmonic frequencies through the sixth harmonic of the applied signals. This was considered adequate, in view of the fact that the energy in successive harmonics of clipped alternating current signals drops off at least in proportion to $1/n$, where $n$ is the harmonic in question. It is to be understood, however, that it is possible to avoid the distortion which might otherwise be introduced by higher harmonics by the use of additional resonant circuit sections, each including an inductor and a capacitor.

By way of example, the values of inductance and capacitance for the network 48 of Fig. 2 have been calculated for a fundamental frequency of 74.2 megacycles per second. In addition, a value of 5.31 micromicrofarads was employed as the value of the shunt capacitance 65. The specific values in micromicrofarads ($\mu\mu$f.) and microhenries ($\mu$h.) are given in the following table:

*Table*

| Resonant Circuit | Capacitance, $\mu\mu$f. | Inductance, $\mu$h. |
|---|---|---|
| 61 | 78.2 | .235 |
| 62 | 7.86 | .259 |
| 63 | 4.76 | .107 |
| 64 | 1.18 | .155 |

Figure 6:
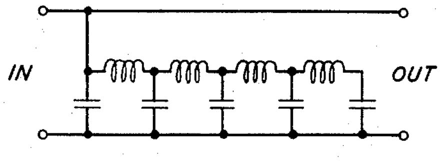
Fig. 6 is a circuit which may be used in place of the network employed in the limiter of Fig. 2.
Figure 7:
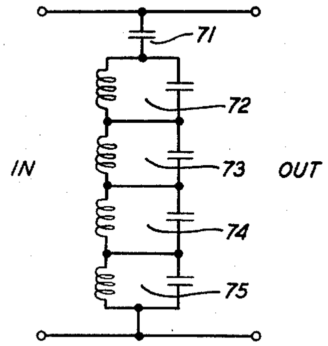
Fig. 7 is another alternative reactive circuit which may be employed instead of the circuit shown in Fig. 2.

Other transmission line type networks may be employed instead of the network 48 of Fig. 2, as illustrated in Figs. 6 and 7. Each of these circuits may be substituted for the network 48, and each of them have approximately the same reactance characteristic as that indicated in Fig. 5 when the proper element values are selected. The circuits of Figs. 6 and 7 are both analyzed in the Guillemin text cited above. Specifically, a circuit similar to that shown in Fig. 6 of the present drawings is illustrated in Fig. 65 of the Guillemin book, and circuits of this type are analyzed in the associated text material. A circuit similar to that shown in Fig. 7 of the present drawings is shown in Guillemin's Fig. 62, and circuits of this type are analyzed in the associated text material. The circuit of Fig. 7 also lends itself readily to analysis in qualitative terms. For example, the infinite reactance of the circuit of Fig. 7 at zero frequency is determined by the presence of the condenser 71. The successive points of infinite reactance at the fundamental frequency and the first three even harmonics are caused by the antiresonant points of the resonant networks 72 through 75, respectively.

Another circuit which may be employed in place of the network 48 of Fig. 2 is a short-circuited transmission line one-quarter wavelength long at the fundamental frequency of the frequency modulation signals. Such a reactive network presents essentially infinite impedance at the fundamental and at odd harmonics thereof. At even harmonics, it presents a short circuit. Accordingly, the impedance at all of the principal harmonics is zero or nearly infinite, and the circuit therefore avoids the undesired amplitude to phase conversion effects discussed above.

It is to be understood that the above-described arrangements are illustrative of the application of the principles of the invention. Numerous other arrangements may be devised by those skilled in the art without departing from the spirit and scope of the invention.

What is claimed is:

1. In combination, a source of frequency modulated signals, two amplitude limiting circuits connected in cascade to receive signals from said signal source, each said limiting circuit comprising amplitude limiting means including oppositely poled based asymmetrically conducting devices for clipping said frequency modulated signals, and reactive transmission line circuit means coupled to said input circuit in parallel with said amplitude limiting means for presenting substantially infinite reactive impedance to the fundamental and substantially zero reactive impedance to the odd harmonics of said frequency modulated waves.

2. In a limiter for frequency modulation systems, an input circuit, means for applying frequency modulated signals to said input circuit, amplitude limiting means including oppositely poled biased asymmetrically conducting devices for clipping said frequency modulated signals, and circuit means coupled to said input circuit in parallel with said amplitude limiting means for presenting substantially infinite reactive impedance to the fundamental and substantially zero reactive impedance to the odd harmonics of said frequency modulated waves, said circuit means including a plurality of resonant circuits.

3. In a limiter for frequency modulation systems, an input circuit, means for applying frequency modulated signals to said input circuit, amplitude limiting means including oppositely poled biased asymmetrically conducting devices for clipping said frequency modulated signals, and circuit means coupled to said input circuit in parallel with said amplitude limiting means for presenting substantially infinite reactive impedance to the fundamental and substantially zero reactive impedance to the odd harmonics of said frequency modulated waves, said circuit means comprising a ladder network of inductance and capacitance elements.

4. In combination, a source of frequency modulated signals, two amplitude limiting circuits connected in cascade to receive signals from said signal source, each said limiting circuit comprising an amplification tube, amplitude limiting means in the output circuit of said tube and including oppositely poled biased diodes for clipping said frequency modulated signals, and circuit means coupled to said amplitude limiting means for presenting substantially infinite reactive impedance to the fundamental and substantially zero reactive impedance to the odd harmonics of said frequency modulated waves, said circuit means comprising a series of iterative reactive circuit units each including an inductor and a capacitor.

5. In a limiter for frequency modulation systems, an input circuit, means for applying frequency modulated signals to said input circuit, amplitude limiting means including oppositely poled biased asymmetrically conducting devices for clipping said frequency modulation signals, and circuit means coupled to said input circuit in parallel with said amplitude limiting means for presenting substantially infinite reactive impedance to the fundamental and substantially zero reactive impedance to the odd harmonics of said frequency modulated waves, said circuit means including a series of at least three iterative reactive circuit units each including an inductance and capacitance resonant at different frequencies.

6. In a circuit for reducing distortion in frequency modulation limiters under conditions of varying input signal level, first and second amplifying devices having significant input and output capacitance, said second amplifying device being connected to receive limited signals from said first amplifying device, means for applying frequency modulated signals of varying amplitude levels to said first amplifying device, amplitude limiting means including oppositely poled biased asymmetrically conducting devices for clipping said frequency modulated signals connected in parallel with the output of said first device, and reactive transmission line circuit means also coupled in parallel with the output of said first amplifying device for presenting substantially infinite reactive impedance to the fundamental and for eliminating the reactive components of the impedance at a plurality of additional harmonics of said frequency modulated signals.

7. In a circuit for reducing distortion in frequency modulation limiters under conditions of varying input signal level, first and second amplifying devices having significant input and output capacitance, said second amplifying device being connected to receive limited signals from said first amplifying device, means for applying frequency modulated signals of varying amplitude levels to said first amplifying device, amplitude limiting means including oppositely poled biased asymmetrically conducting devices for clipping said frequency modulated signals connected in parallel with the output of said first device, and reactive transmission line circuit means also coupled in parallel with the output of said first amplifying device for presenting substantially infinite reactive impedance to the fundamental and purely resistive impedance to a plurality of additional harmonics of said frequency modulated signals.

8. In a circuit for reducing distortion in frequency modulation limiters under conditions of varying input signal level, first and second amplifying devices having significant input and output capacitance, said second amplifying device being connected to receive modified signals from said first amplifying device, means for applying frequency modulated signals of varying amplitude levels to said first amplifying device, amplitude limiting means including oppositely poled biased asymmetrically conducting devices for clipping said frequency modulated signals connected in parallel with the output of said first device, and reactive transmission line circuit means also coupled in parallel with the output of said first amplifying device for presenting substantially infinite reactive impedance to the fundamental and purely resistive impedance to a plurality of additional harmonics of said frequency modulated signals, said circuit means comprising at least three reactive circuits resonant at different frequencies.

9. In a circuit for reducing distortion in frequency modulation limiters under conditions of varying input signal level, first and second amplifying devices having significant input and output capacitance, said second amplifying device being connected to receive limited signals from said first amplifying device, means for applying frequency modulated signals of varying amplitude levels to said first amplifying device, amplitude limiting means including oppositely poled biased asymmetrically conducting devices for clipping said frequency modulated signals connected in parallel with the output of said first device, and reactive transmission line circuit means also coupled in parallel with the output of said first amplifying device for presenting purely resistive impedance at the fundamental and at the principal harmonics of said frequency modulated signals.

References Cited in the file of this patent

UNITED STATES PATENTS

| | | |
|---|---|---|
| 2,241,831 | Wahlquist | May 13, 1941 |
| 2,390,502 | Atkins | Dec. 11, 1945 |
| 2,461,321 | Guillemin | Feb. 8, 1949 |
| 2,552,348 | Shapiro, et al. | May 8, 1951 |
| 2,629,049 | Miller et al. | Feb. 17, 1953 |
| 2,682,037 | Bobis et al. | June 22, 1954 |
| 2,731,571 | Chance | Jan. 17, 1956 |
| 2,790,954 | Carrington | Apr. 30, 1957 |